United States Patent
Wang et al.

(10) Patent No.: US 10,114,735 B2
(45) Date of Patent: Oct. 30, 2018

(54) METHOD, DEVICE AND MEDIUM FOR MANAGING APPLICATION PROGRAM

(71) Applicant: Beijing Xiaomi Mobile Software Co., Ltd., Haidian District, Beijing (CN)

(72) Inventors: Yufei Wang, Beijing (CN); Chenxi Wang, Beijing (CN); Ming Liu, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/378,051

(22) Filed: Dec. 14, 2016

(65) Prior Publication Data

US 2017/0315901 A1    Nov. 2, 2017

(30) Foreign Application Priority Data

Apr. 28, 2016 (CN) .......................... 2016 1 0273902

(51) Int. Cl.
*G06F 9/44* (2018.01)
*G06F 11/36* (2006.01)

(52) U.S. Cl.
CPC ........ *G06F 11/3664* (2013.01); *G06F 11/362* (2013.01)

(58) Field of Classification Search
CPC .................................................. G06F 11/3664
USPC ......................................................... 717/125
See application file for complete search history.

(56) References Cited

U.S. PATENT DOCUMENTS

| | | | |
|---|---|---|---|
| 2006/0005260 | A1 | 1/2006 | Haruki |
| 2006/0225134 | A1* | 10/2006 | Conti ...................... G06F 21/52 726/22 |
| 2006/0294369 | A1 | 12/2006 | Matsushima |
| 2007/0168972 | A1* | 7/2007 | Bates .................. G06F 11/3664 717/124 |
| 2007/0234430 | A1 | 10/2007 | Goldsmid |
| 2009/0150685 | A1 | 6/2009 | Matsushima |
| 2009/0307783 | A1 | 12/2009 | Maeda |
| 2012/0198243 | A1 | 8/2012 | Matsushima |
| 2013/0312064 | A1 | 11/2013 | Matsushima et al. |
| 2014/0380503 | A1 | 12/2014 | Matsushima et al. |
| 2015/0227449 | A1 | 8/2015 | Kuang et al. |

(Continued)

FOREIGN PATENT DOCUMENTS

| | | |
|---|---|---|
| CN | 1953459 A | 4/2007 |
| CN | 101427222 A | 5/2009 |

(Continued)

OTHER PUBLICATIONS

International Search Report in international application No. PCT/CN2016/095904, dated Feb. 7, 2017.

(Continued)

*Primary Examiner* — James D Rutten
(74) *Attorney, Agent, or Firm* — Jun He Law Offices P.C.; James J. Zhu (57) ABSTRACT

A method, a device and a medium for managing an application program are provided. The method includes: type information of a first application program running on a foreground of a terminal is acquired; and the first application program is prevented from being debugged by other application programs if the type information of the first application program is preset type information.

11 Claims, 4 Drawing Sheets

(56) References Cited

U.S. PATENT DOCUMENTS

2016/0070938 A1    3/2016  Matsushima et al.
2016/0300044 A1    10/2016 Nam et al.

FOREIGN PATENT DOCUMENTS

| CN | 101853352 A | 10/2010 |
| CN | 103713889 A | 4/2014 |
| CN | 104932972 A | 9/2015 |
| EP | 2023248 A1 | 2/2009 |
| WO | 2015072689 A1 | 5/2015 |

OTHER PUBLICATIONS

Extended European Search Report for European application No. 16202284.2, dated Jun. 22, 2017.

\* cited by examiner

METHOD, DEVICE AND MEDIUM FOR MANAGING APPLICATION PROGRAM

CROSS-REFERENCE TO RELATED APPLICATIONS

This application is filed based upon and claims priority to Chinese Patent Application No. 201610273902.1, filed on Apr. 28, 2016, the entire contents of which are incorporated herein by reference.

TECHNICAL FIELD

The present disclosure generally relates to the technical field of computers, and more particularly, to a method, a device and a medium for managing an application program.

BACKGROUND

With continuous development of a mobile terminal technology, more and more application programs are developed and become indispensable assistants in people's lives. A system program usually provides a debugging function for an application program such that another application program can perform processing such as testing and regulation on the application program.

When an application program runs, some data is required to be processed by a system program, and the data is cached in a corresponding cache space by the system program. If an application program A debugs an application program B, the application program A may send a request for acquiring data of the application program B to the system program. The system program may further call the data of the application program B from a corresponding cache space of the application program B and send the data to the application program A.

When a certain application program runs, if a virus application program debugs the application program by certain means, the virus application program may acquire private data of a user through the system program, which leads to reduced security of user information.

SUMMARY

According to a first aspect of embodiments of the present disclosure, there is provided a method for managing an application program. The method includes: acquiring type information of a first application program running on a foreground of a terminal; and preventing the first application program from being debugged by other application programs if the type information of the first application program is preset type information.

According to a second aspect of embodiments of the present disclosure, there is provided a device for managing an application program. The device includes: a processor; and a memory configured to store instructions executable by the processor, wherein the processor is configured to: acquire type information of a first application program running on a foreground of a terminal; and prevent the first application program from being debugged by other application programs if the type information of the first application program is preset type information.

According to a third aspect of embodiments of the present disclosure, there is provided a non-transitory computer-readable storage medium having stored therein instructions that, when executed by a processor of a terminal, causes the terminal to perform a method for managing an application program. The method includes: acquiring type information of a first application program running on a foreground of a terminal; and preventing the first application program from being debugged by other application programs if the type information of the first application program is preset type information.

It is to be understood that both the foregoing general description and the following detailed description are exemplary and explanatory only and are not restrictive of the invention, as claimed.

BRIEF DESCRIPTION OF THE DRAWINGS

In order to describe the technical solutions in the embodiment of the present disclosure more clearly, the drawings required by description about the embodiment will be simply introduced below, the drawings described below are apparently only some embodiments of the present disclosure, and those skilled in the art may also obtain other drawings according to these drawings without creative work.

DETAILED DESCRIPTION

Implementations of the present disclosure will be further described in detail below with reference to the drawings.

The embodiment of the present disclosure provides a method for managing an application program, and the method is applied to a terminal. The terminal may be any mobile terminal, such as a mobile phone and a tablet computer, having installed thereon an application program. A processor, a memory, a screen, an input unit and a communication part may be arranged in the terminal. The processor may be configured to process a process of managing the application program. The memory may be configured to store data required and data generated in the following process. The screen may be configured to display a content to be displayed to a user in the following process, such as state information of the application program. The input unit, such as a keyboard and a Microphone (MIC), may be configured for a user to input an instruction or set information to the terminal. The communication part, such as a BlueTooth (BT) part and an antenna, may be configured to receive or send data involved in the following process. In the embodiment, a mobile phone is taken as an example of the terminal, and embodiments under other conditions are similar, and will not be elaborated in the present embodiment. In addition, the following processing may be applied to the terminal, or a security management program installed on the terminal.

Figure 1:
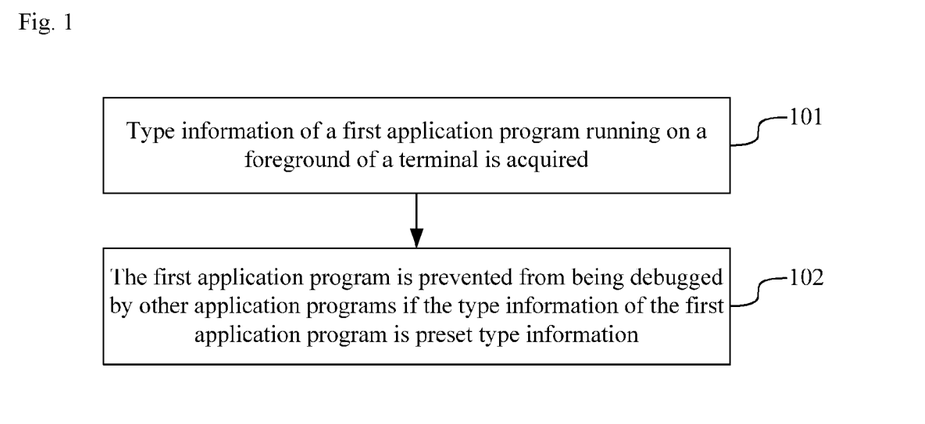
FIG. 1 is a flow chart showing a method for managing an application program, according to an embodiment of the present disclosure.

A processing flow shown in FIG. 1 will be described in detail below with reference to specific implementations, and may include the following contents.

In step 101, type information of a first application program running on a foreground of a terminal is acquired.

During implementation, an application program running on the terminal may have two states: running on the foreground and running on a background. The application program running on the foreground is specifically characterized by whether a page content of the application program is displayed on a screen of the terminal or not. Under most conditions, when using the terminal, the user interacts with the application program running on the foreground. When a certain application program is started on the terminal, it may be considered to run on the foreground, and then may selectively enter the background of the terminal for running or keep running on the foreground of the terminal according to a requirement of the user or a setting of the terminal. Meanwhile, there is only one application program running on the foreground of the terminal at any time. Specifically, the terminal may monitor a foreground process of a system program. When a certain application program (i.e. the first application program) is started or enters the foreground of the terminal for running, type information of the application program may be acquired by the system program. The application program may include an instant messaging type, a shopping type, a payment type, an entertainment type and the like according to a main function or effect.

In step 102, the first application program is prevented from being debugged by other application programs if the type information of the first application program is preset type information.

Figure 2:
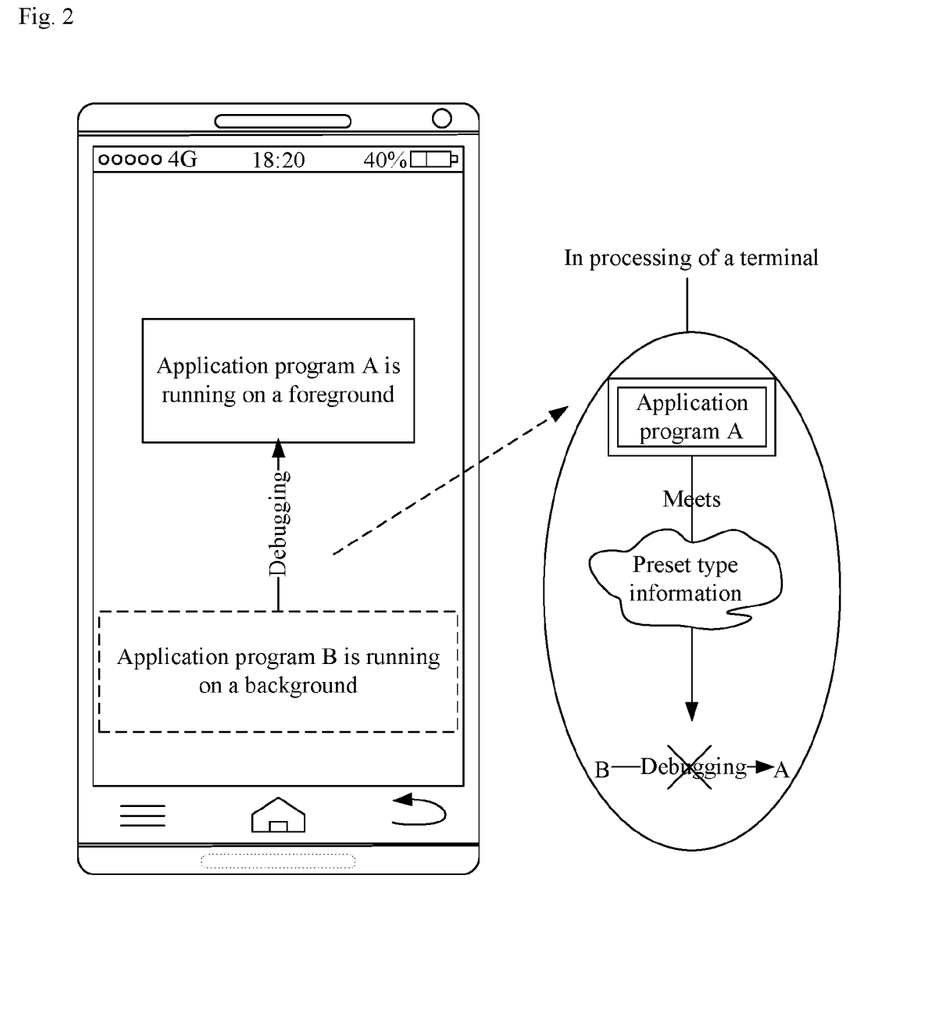
FIG. 2 is a diagram of preventing debugging, according to an embodiment of the present disclosure.

During implementation, under a normal condition, to facilitate important operation such as bug fixation and function regulation over an application program, a developer of the application program may set a debugging function for the application program. That is, the system program or another application program may debug the application program to further implement operation, such as key file modification and log data reading, which may not be implemented in a normal running state over the application program. When the application program runs in a debugging state, a debugging initiator of the application program may apply for and acquire all data information of the application program from the system program, including a basic setting of the application program, private data of the user and the like. To protect important information of a user from being stolen by malicious software or a virus, debugging functions of application programs of some types may be controlled to stop malicious software or viruses from debugging the application programs of these types to acquire the user information. Specifically, the user may preset on the terminal a type of an application program that needs data protection, such as a payment application program and an instant message application program. Furthermore, the terminal may judge whether the type information of the first application program belongs to the preset type information or not after acquiring the type information of the first application program running on the foreground. If the type information of the first application program is the preset type information, the system program may prevent the first application program from being debugged by other application programs to ensure that the other application programs cannot acquire related data of the first application program by debugging the first application program. FIG. 2 is a diagram of the abovementioned processing. It is to be noted that the first application program may enter a debugging mode when the other application programs debug the first application program, and the other application programs may acquire a cache address of the related data of the first application program so as to apply for and acquire data corresponding to the cache address from the system program.

There are various manners in which the first application program is prevented from being debugged by the other application programs, which are provided below.

In some embodiments, a debugging function of the first application program is disabled if the type information of the first application program is the preset type information.

During implementation, when the type information of the first application program acquired by the terminal is the preset type information, the debugging function of the first application program may be disabled. That is, all application programs are rejected to initiate debugging to the first application program.

In some embodiments, the first application program is debugged by the system program to occupy a debugging channel of the first application program if the type information of the first application program is the preset type information.

During implementation, when the type information of the first application program acquired by the terminal is the preset type information, the first application program may be debugged by the system program. In such a manner, since the first application program may be debugged by only one application program at the same time, the other application programs cannot debug the first application program when the system program debugs the first application program, so data of the first application program may not be stolen by malicious software or a virus by means of debugging the first application program.

In some embodiments, if the type information of the first application program is the preset type information, a debugging state of the first application program is continuously detected. When it is detected that the first application program enters the debugging state, an application program that initiates debugging to the first application program is closed.

During implementation, whether the first application program enters the debugging state or not may be judged according to running state information of the first application program at first. Specifically, when the type information of the first application program acquired by the terminal is the preset type information, the debugging state of the first application program may be continuously monitored. When it is detected that the first application program enters the debugging state, the application program that initiates debugging to the first application program may be closed to prevent user information stored in a cache of the first application program from being acquired by the application program.

In some embodiments, the debugging function of the first application program may be opened for some secure application programs. Specific processing may be as follows: when it is detected that the first application program enters the debugging state, the application program that initiates debugging to the first application program is determined, and a pre-stored list of application programs authorized to perform debugging and corresponding to the first application program are acquired. If the application program that initiates debugging to the first application program is not contained in the list of application program authorized to perform debugging, the application program that initiates debugging to the first application program is closed.

During implementation, a list of application programs authorized to perform debugging may be set for each application program, as shown in Table 1, and identification information of the application programs allowed to debug the first application program may be recorded in the list. When it is detected that the first application program enters the debugging state, identification information (such as a packet name) of a debugging initiator may be acquired based on a running log of the first application program, so that the application program that initiates debugging to the first application program may be determined. Meanwhile, the application programs authorized to perform debugging may be determined by acquiring the list of application programs authorized to perform debugging and corresponding to the first application program. If the identification information of the application program that initiates debugging to the first application program is not contained in the list of application programs authorized to perform debugging, it may be determined that the application program is not allowed to debug the first application program, and thus the application program may be closed. Furthermore, security detection may be performed on the application program, and if it is determined that the application program is malicious software or a virus, the application program may be uninstalled.

TABLE 1

| Application to be debugged | Initiating application authorized to perform debugging |
| --- | --- |
| Application program A | Application program 1 |
|  | Application program 5 |
|  | Application program 7 |
| Application program B | Application program 1 |
|  | Application program 9 |
| Application program C | None |
| ... | ... |

Optionally, the user may authorize any application program to debug the first application program, and corresponding processing may be as follows: when an input instruction for authorizing a second application program to debug the first application program is received from a user, the operation of preventing the first application program from being debugged by the second application program is canceled.

During implementation, if the user needs to debug the first application program through other application programs such as the second application program, a debugging authorization page of the system program may be opened. Identification information of the application initiating debugging such as the second application program and the application to be debugged such as the first application program may be input into the debugging authorization page respectively. Then the terminal may receive the input instruction for authorizing the second application program to perform debugging over the first application program from the user, thereby canceling the operation of preventing the first application program from being debugged by the second application program. Specifically, for the abovementioned preventing manners, a variety of manners are provided. As to the embodiment of disabling a debugging function of the first application program if the type information of the first application program is the preset type information, the debugging function of the first application program may be temporarily enabled, and after the second application program finishes debugging the first application program, the debugging function of the first application program is disabled. As to the embodiment of debugging the first application program by the system program to occupy a debugging channel of the first application program if the type information of the first application program is the preset type information, debugging of the system program over the first application program may be stopped immediately to make the debugging channel of the first application program idle for the second application program, and after the second application program finishes debugging the first application program, the first application program is debugged by the system program again. As to the embodiment of continuously detecting a debugging state of the first application program if the type information of the first application program is the preset type information, the second application program may be directly added into the list of application programs authorized to perform debugging, and when the second application program initiates debugging to the first application program, no operation of preventing is performed.

Optionally, when the first application program is switched from running on the foreground into running on the background, the first application program may be continuously prevented from being debugged by the other application programs.

During implementation, after the first application program is prevented from being debugged by the other application programs, if the first application program is switched to run on the background of the terminal, the first application program may be continuously prevented from being debugged by the other application programs until the user closes the first application program.

In the embodiment of the present disclosure, the type information of the first application program running on the foreground of the terminal is acquired; the first application program is prevented from being debugged by the other application programs if the type information of the first application program is the preset type information. In such a manner, when the first application program runs, the other application programs cannot debug the first application program to acquire the user information, so that the security of the user information can be enhanced.

Figure 3:
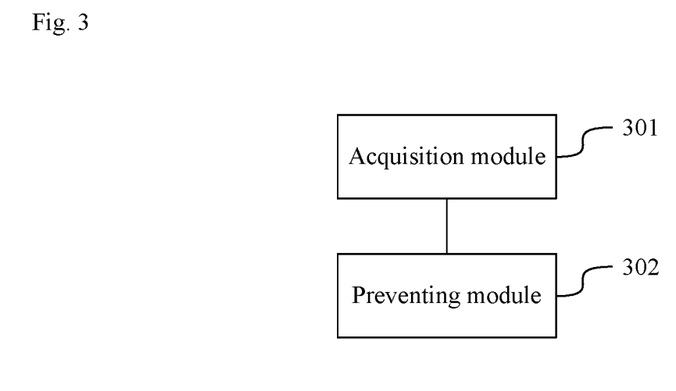
FIG. 3 is a schematic diagram of a structure of a device for managing an application program, according to an embodiment of the present disclosure.

The embodiment of the present disclosure further provides a device for managing an application program, and as shown in FIG. 3, the device includes an acquisition module 301 and a preventing module 302.

The acquisition module 301 is configured to acquire type information of a first application program running on a foreground of a terminal.

The preventing module 302 is configured to prevent the first application program from being debugged by other application programs if the type information of the first application program is preset type information.

In some embodiments, the preventing module 302 is configured to disable a debugging function of the first application program if the type information of the first application program is the preset type information.

In some embodiments, the preventing module 302 is configured to debug the first application program by a system program to occupy a debugging channel of the first application program if the type information of the first application program is the preset type information.

Figure 4:
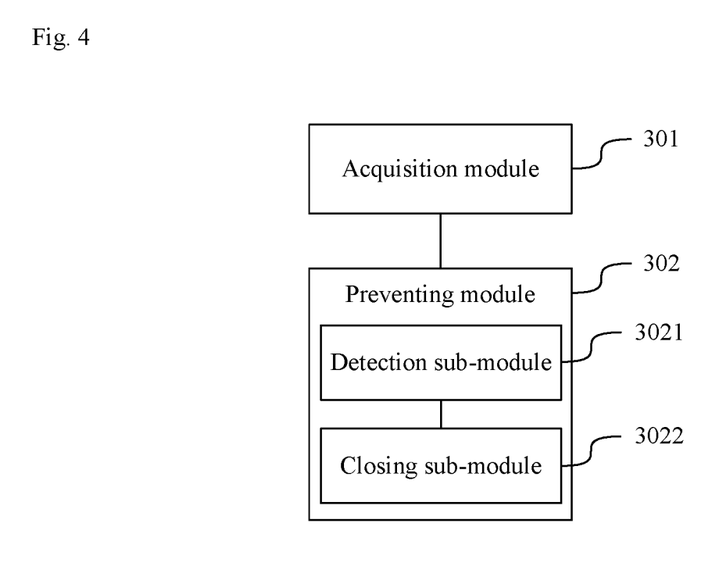
FIG. 4 is a schematic diagram of a structure of another device for managing an application program, according to an embodiment of the present disclosure.

In some embodiments, as shown in FIG. 4, the preventing module 302 includes a detection sub-module 3021 and a closing sub-module 3022.

The detection sub-module 3021 is configured to continuously detect a debugging state of the first application program if the type information of the first application program is the preset type information.

The closing sub-module 3022 is configured to close an application program that initiates debugging to the first application program when it is detected that the first application program enters the debugging state.

Figure 5:
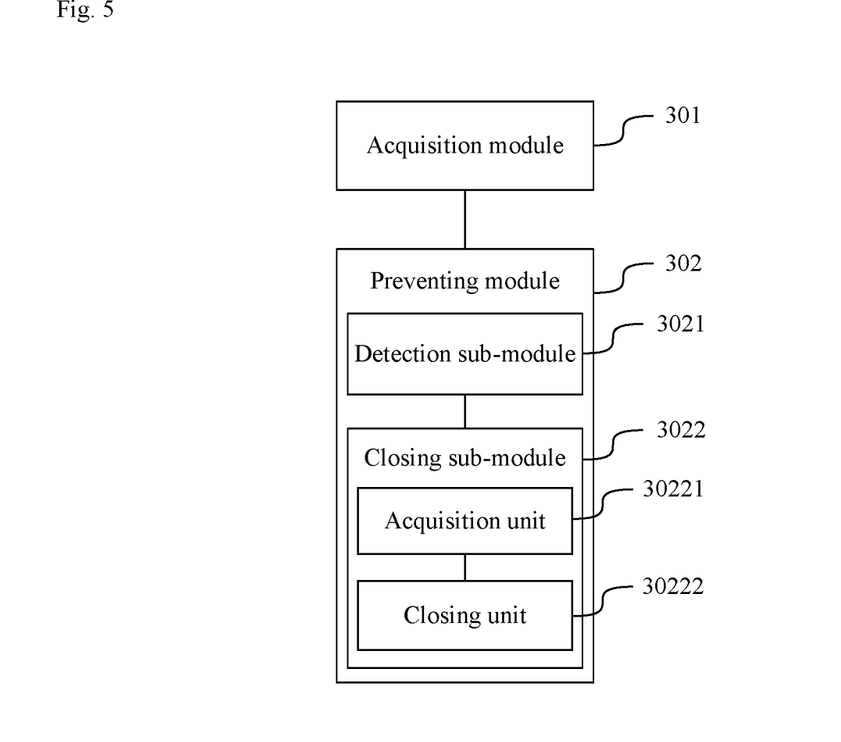
FIG. 5 is a schematic diagram of a structure of another device for managing an application program, according to an embodiment of the present disclosure.

Optionally, as shown in FIG. 5, the closing sub-module 3022 includes an acquisition unit 30221 and a closing unit 30222.

The acquisition unit 30221 is configured to, when it is detected that the first application program enters the debugging state, determine the application program that initiates debugging to the first application program, and acquire a pre-stored list of application program authorized to perform debugging and corresponding to the first application program.

The closing unit 30222 is configured to, if the application program that initiates debugging to the first application program is not contained in the list of application programs authorized to perform debugging, close the application program that initiates debugging to the first application program.

Figure 6:
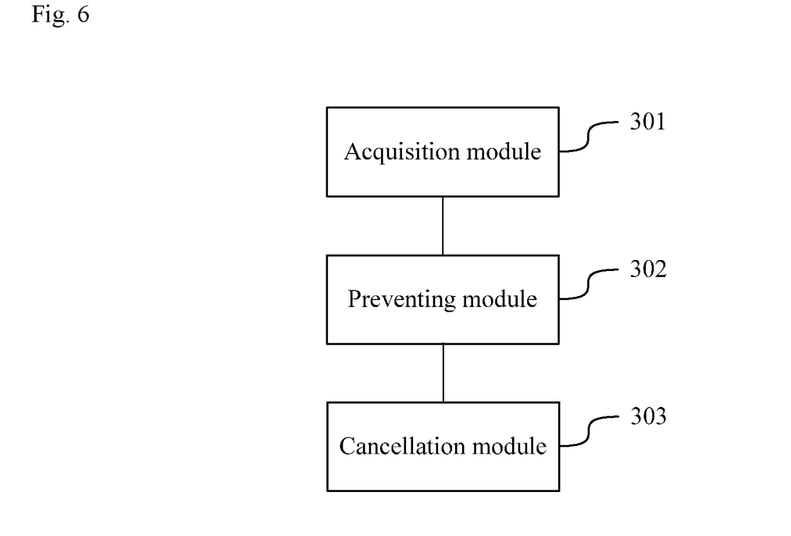
FIG. 6 is a schematic diagram of a structure of another device for managing an application program, according to an embodiment of the present disclosure.

Optionally, as shown in FIG. 6, the device further includes a cancellation module 303.

The cancellation module 303 is configured to, when an input instruction for authorizing a second application program to debug the first application program is received from a user, cancel the operation of preventing the first application program from being debugged by the second application program.

In the embodiment of the present disclosure, the type information of the first application program running on the foreground of the terminal is acquired; the first application program is prevented from being debugged by the other application programs if the type information of the first application program is the preset type information. In such a manner, when the first application program runs, the other application programs cannot debug the first application program to acquire user information, so that security of the user information can be enhanced.

It is to be noted that: when the device for managing the application program provided by the embodiment manages the application program, descriptions are made only with division of each of the abovementioned functional modules as an example, and during a practical application, the abovementioned functions may be allocated to different functional modules for realization according to a requirement, that is, an internal structure of the device is divided into different functional modules to realize all or part of the abovementioned functions. In addition, the device for managing the application program provided by the embodiment belongs to the same concept with the embodiment of the method for managing the application program, and for details about its specific implantation process, please refer to the embodiment of the method, and will not be elaborated herein.

Figure 7:
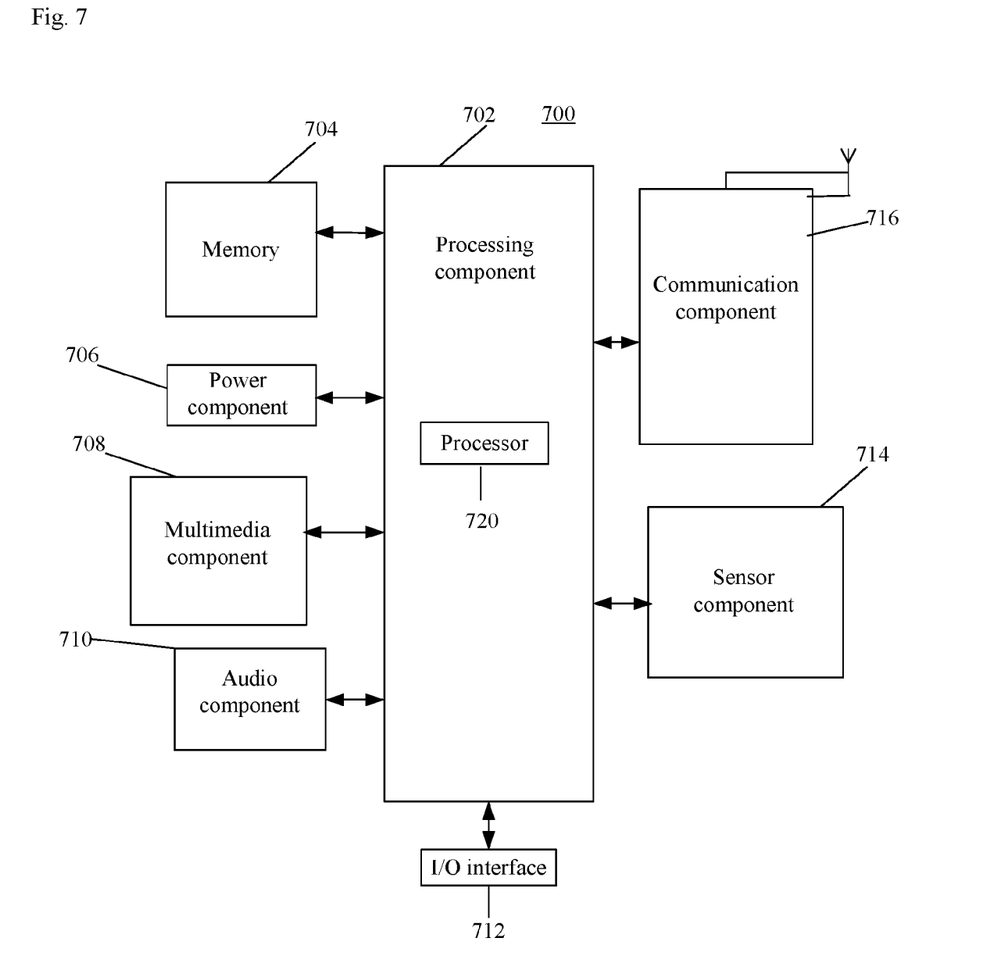
FIG. 7 is a schematic diagram of a structure of a terminal, according to an embodiment of the present disclosure.

There is provided a schematic diagram of a structure of a terminal, according to another exemplary embodiment of the present disclosure. The terminal may be a mobile phone and the like.

Referring to FIG. 7, the terminal 700 may include one or more of the following components: a processing component 702, a memory 704, a power component 706, a multimedia component 708, an audio component 710, an Input/Output (I/O) interface 712, a sensor component 714, and a communication component 716.

The processing component 702 typically controls overall operations of the terminal 700, such as the operations associated with display, telephone calls, data communications, camera operations, and recording operations. The processing component 702 may include one or more processors 720 to execute instructions to perform all or part of the steps in the abovementioned method. Moreover, the processing component 702 may include one or more modules which facilitate interaction between the processing component 702 and the other components. For instance, the processing component 702 may include a multimedia module to facilitate interaction between the multimedia component 708 and the processing component 702.

The memory 704 is configured to store various types of data to support the operation of the terminal 700. Examples of such data include instructions for any application programs or methods configured for operating on the terminal 700, contact data, phonebook data, messages, pictures, video, etc. The memory 704 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 provides power for various components of the terminal 700. The power component 706 may include a power management system, one or more power supplies, and other components associated with the generation, management and distribution of power for the terminal 700.

The multimedia component 708 includes a screen providing an output interface between the terminal 700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 708 includes a front camera and/or a rear camera. The front camera and/or the rear camera may receive external multimedia data when the terminal 700 is in an operation mode, such as a photographing mode or a video mode. Each of the front camera and the rear camera may be a fixed optical lens system or have capabilities of focusing and optical zooming.

The audio component 710 is configured to output and/or input an audio signal. For example, the audio component 710 includes a MIC which is configured to receive an external audio signal when the terminal 700 is in the operation mode, such as a call mode, a recording mode and a voice recognition mode. The received audio signal may be further stored in the memory 704 or sent through the communication component 716.

The I/O interface 712 provides an interface between the processing component 702 and a peripheral interface module, and the peripheral interface module may be a keyboard, a click wheel, a button and the like. The button may include, but not limited to: a home button, a volume button, a starting button and a locking button.

The sensor component 714 includes one or more sensors configured to provide status assessment in various aspects for the terminal 700. For instance, the sensor component 714 may detect an on/off status of the terminal 700 and relative positioning of components, such as a display and keypad of the terminal 700, and the sensor component 714 may further detect a change in a position of the terminal 700 or a component of the terminal 700, presence or absence of contact between the user and the terminal 700, orientation or acceleration/deceleration of the terminal 700 and a change in temperature of the terminal 700. The sensor component 714 may include a proximity sensor which is configured to detect presence of an object nearby without any physical contact. The sensor component 714 may also include a light sensor, such as a Complementary Metal Oxide Semiconductor (CMOS) or Charge Coupled Device (CCD) image sensor which is configured for use in an imaging application. In some embodiments, the sensor component 714 may also include an acceleration sensor, a gyroscope sensor, a magnetic sensor, a pressure sensor or a temperature sensor.

The communication component 716 is configured to facilitate wired or wireless communication between the terminal 700 and another device. The terminal 700 may access a communication-standard-based wireless network, such as a Wireless Fidelity (WiFi) network, a $2^{nd}$-Generation (2G) or $3^{rd}$-Generation (3G) network or a combination thereof. In an exemplary embodiment, the communication component 716 receives a broadcast signal or broadcast associated information from an external broadcast management system via a broadcast channel. In an exemplary embodiment, the communication component 716 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and another technology.

In an exemplary embodiment, the terminal 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, which are configured to execute the abovementioned method.

In an exemplary embodiment, there is also provided a non-transitory computer-readable storage medium containing instructions, such as the memory 704 containing instructions, and the instructions may be executed by the processor 720 of the terminal 700 to perform the abovementioned method. For example, the non-transitory computer-readable storage medium may be a ROM, a Compact Disc Read-Only Memory (CD-ROM), a magnetic tape, a floppy disc, an optical data storage device and the like.

According to a non-transitory computer-readable storage medium, the instructions in the storage medium is executed by a processor of a terminal to enable the terminal to perform a method for managing an application program. The method includes: type information of a first application program running on a foreground of the terminal is acquired; and the first application program is prevented from being debugged by other application programs if the type information of the first application program is preset type information.

Optionally, the step that the first application program is prevented from being debugged by the other application programs if the type information of the first application program is the preset type information includes: a debugging function of the first application program is disabled if the type information of the first application program is the preset type information.

Optionally, the step that the first application program is prevented from being debugged by the other application programs if the type information of the first application program is the preset type information includes: the first application program is debugged by a system program to occupy a debugging channel of the first application program if the type information of the first application program is the preset type information.

Optionally, the step that the first application program is prevented from being debugged by the other application programs if the type information of the first application program is the preset type information includes: a debugging state of the first application program is continuously detected if the type information of the first application program is the preset type information; and an application program that initiates debugging to the first application program is closed when it is detected that the first application program enters the debugging state.

Optionally, the step that the application program that initiates debugging to the first application program is closed when it is detected that the first application program enters the debugging state includes: when it is detected that the first application program enters the debugging state, the application program that initiates debugging to the first application program is determined, and a pre-stored list of application programs authorized to perform debugging and corresponding to the first application program are acquired; and if the application program that initiates debugging to the first application program is not contained in the list of application programs authorized to perform debugging, the application program that initiates debugging to the first application program is closed.

Optionally, the method further includes: when an input instruction for authorizing a second application program to debug the first application program is received from a user, the operation of preventing the first application program from being debugged by the second application program is canceled.

In the embodiment of the present disclosure, the type information of the first application program running on the foreground of the terminal is acquired; the first application program is prevented from being debugged by the other application programs if the type information of the first application program is the preset type information. In such a manner, when the first application program runs, the other application programs cannot debug the first application program to acquire user information, so that security of the user information can be enhanced.

Those skilled in the art may understand that all or part of the steps for implementing the embodiments may be implemented by hardware, and may also be implemented by related hardware instructed by a program which may be stored in a computer-readable storage medium which may be a ROM, a magnetic, optical disk or the like.

The above is only the preferred embodiment of the present disclosure and not intended to limit the present disclosure, and any modifications, equivalent replacements, improvements and the like made within the spirit and principle of the present disclosure shall fall within the scope of protection of the present disclosure.

What is claimed is:

1. A method for managing an application program, comprising:
   acquiring type information of a first application program running on a foreground of a terminal; and
   preventing the first application program from being debugged by other application programs if the type information of the first application program is preset type information;
   wherein preventing the first application program from being debugged by other application programs comprises:
      acquiring identification information of a second application program, which initiates debugging to the first application program, based on a running log of the first application program, and determining the second application program according to the identification information when it is detected that the first application program is being debugged;
      acquiring a pre-stored list of application programs recording identification information of the application programs allowed to debug the first application program; and
      determining that the second application program is not allowed to debug the first application program, and closing the second application program when the second application program is not contained in the pre-stored list of application programs.

2. The method according to claim 1, wherein preventing the first application program from being debugged by the other application programs if the type information of the first application program is the preset type information comprises:
   disabling a debugging function of the first application program if the type information of the first application program is the preset type information.

3. The method according to claim 1, wherein preventing the first application program from being debugged by other application programs if the type information of the first application program is the preset type information comprises:
   debugging, by a system program, the first application program to occupy a debugging channel of the first application program if the type information of the first application program is the preset type information.

4. The method according to claim 1, wherein preventing the first application program from being debugged by the other application programs if the type information of the first application program is the preset type information comprises:
   continuously detecting a debugging state of the first application program if the type information of the first application program is the preset type information; and
   closing an application program that initiates debugging to the first application program when it is detected that the first application program enters the debugging state.

5. The method according to claim 1, further comprising:
   canceling the operation of preventing the first application program from being debugged by other application programs when an input instruction for authorizing the second application program to debug the first application program is received from a user.

6. A device for managing an application program, comprising:
   a processor; and
   a memory configured to store instructions executable by the processor,
   wherein the processor is configured to:
   acquire type information of a first application program running on a foreground of a terminal; and
   prevent the first application program from being debugged by other application programs if the type information of the first application program is preset type information, comprising:
      acquiring identification information of a second application program, which initiates debugging to the first application program, based on a running log of the first application program when it is detected that the first application program is being debugged, and determining the second application program according to the identification information;
      acquiring a pre-stored list of application programs recording identification information of the application programs allowed to debug the first application program; and
      determining that the second application program is not allowed to debug the first application program, and closing the second application program when the second application program is not contained in the pre-stored list of application programs.

7. The device according to claim 6, wherein the processor is further configured to:
   disable a debugging function of the first application program if the type information of the first application program is the preset type information.

8. The device according to claim 6, wherein the processor is further configured to:
   debug the first application program by a system program to occupy a debugging channel of the first application program if the type information of the first application program is the preset type information.

9. The device according to claim 6, wherein the processor is further configured to:
   continuously detect a debugging state of the first application program if the type information of the first application program is the preset type information; and
   close an application program that initiates debugging to the first application program when it is detected that the first application program enters the debugging state.

10. The device according to claim 6, the processor is further configured to:
    cancel the operation of preventing the first application program from being debugged by other application programs, when an input instruction for authorizing the second application program to debug the first application program is received from a user.

11. A non-transitory computer-readable storage medium having stored therein instructions that, when executed by a processor of a terminal, causes the terminal to perform a method for managing an application program, the method comprising:
    acquiring type information of a first application program running on a foreground of a terminal; and
    preventing the first application program from being debugged by other application programs if the type information of the first application program is preset type information;
    wherein preventing the first application program from being debugged by other application programs comprises:
       acquiring identification information of a second application program, which initiates debugging to the first application program, based on a running log of the first application program when it is detected that the first application program is being debugged, and determining the second application program according to the identification information;

acquiring a pre-stored list of application programs recording identification information of the application programs allowed to debug the first application program; and determining that the second application program is not allowed to debug the first application program, and closing the second application program when the second application program is not contained in the pre-stored list of application programs.

* * * * *